J. ARN.
TIRE.
APPLICATION FILED JUNE 6, 1916.

1,242,123.

Patented Oct. 9, 1917.
2 SHEETS—SHEET 1.

John Arn
Inventor

Witness

By John Louis Waters & Co.
Attorney

J. ARN.
TIRE.
APPLICATION FILED JUNE 6, 1916.

1,242,123.

Patented Oct. 9, 1917.
2 SHEETS—SHEET 2.

John Arn
Inventor

Witness

By John Louis Waters & Co.
Attorney

UNITED STATES PATENT OFFICE.

JOHN ARN, OF COLUMBUS, OHIO.

TIRE.

1,242,123.  Specification of Letters Patent.  Patented Oct. 9, 1917.

Application filed June 6, 1916. Serial No. 102,016.

*To all whom it may concern:*

Be it known that I, JOHN ARN, a citizen of the United States, residing at Columbus, in the county of Franklin and State of Ohio, have invented certain useful Improvements in Tires, of which the following is a specification, reference being had therein to the accompanying drawings.

This invention relates to improvements in tires, one object of the invention being the provision of a tire which has all of the advantages and none of the disadvantages of a pneumatic tire in that the tread surface is resiliently supported by springs and non-puncturable means, and is readily connected to and detached from the usual rims.

A further object of this invention is the provision of a spring tire which has sufficient resiliency and yet is so constructed that the springs are not forced to carry the full weight, they being limited to a certain extent in compressibility by means of a solid compressible substance such as solid rubber.

In the accompanying drawings:—

Figure 1:
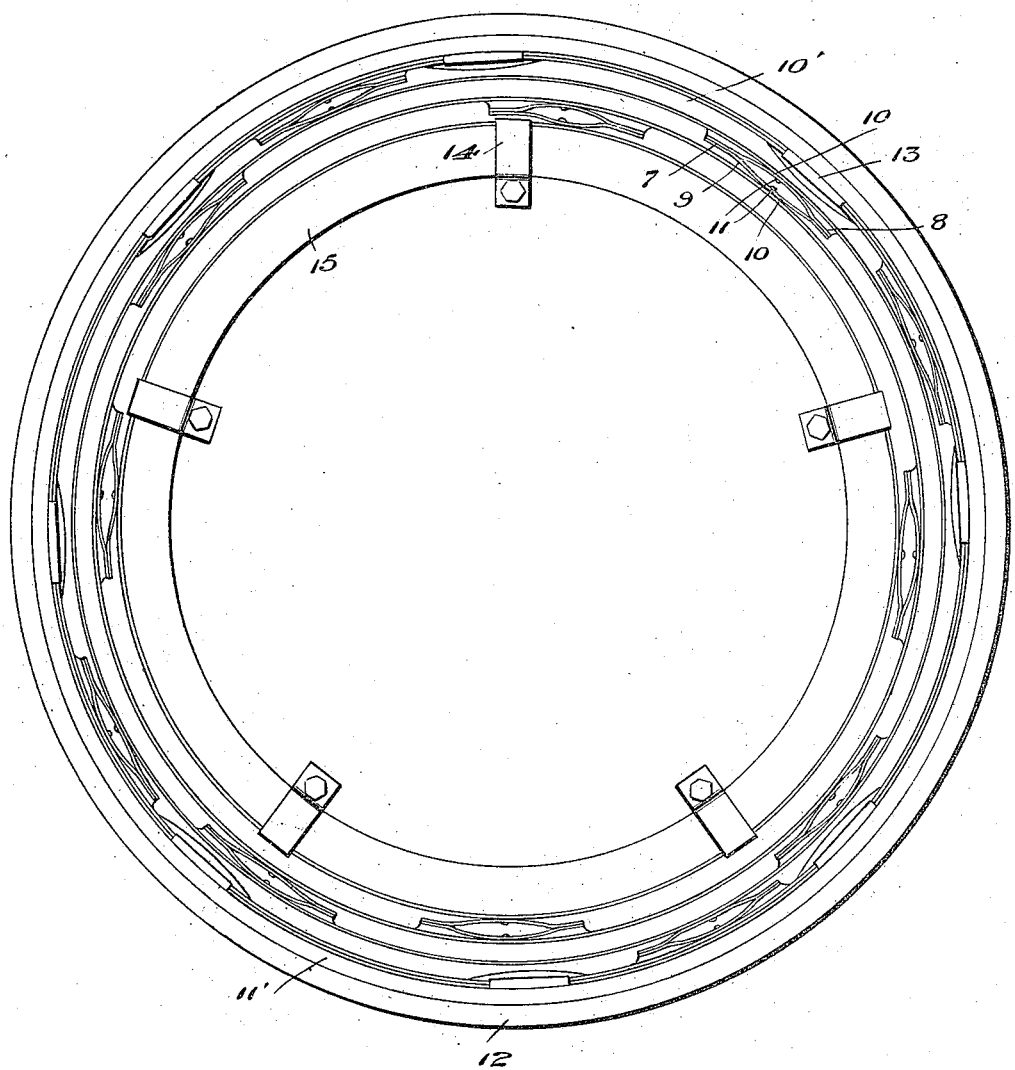
Figure 1 is a side elevation of a tire made according to and embodying the present invention, the same being shown attached to a wheel rim.
Figure 2:
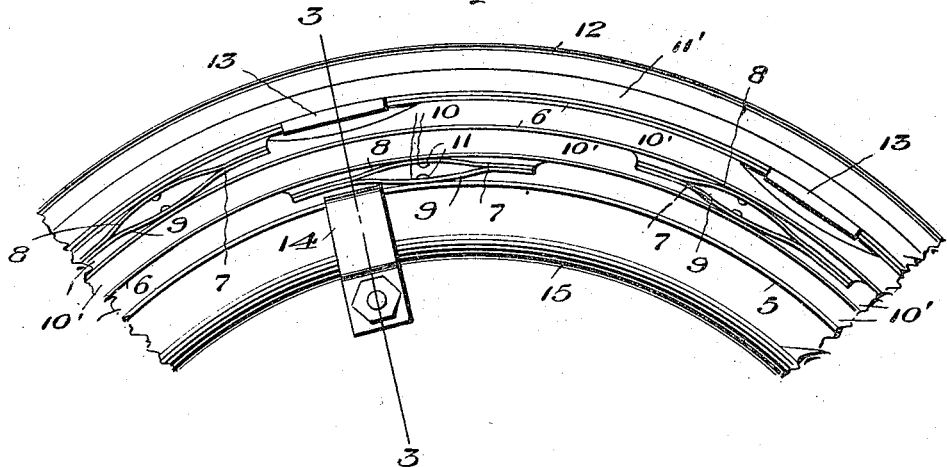
Fig. 2 is an enlarged view of a portion of the tire *per se*.
Figure 3:
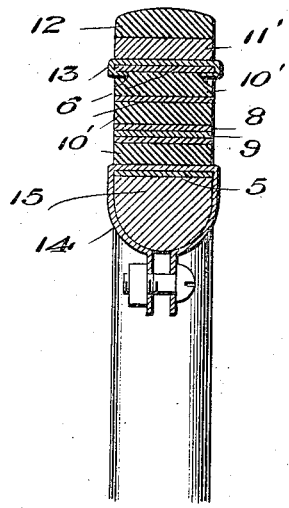
Fig. 3 is a cross section taken on line 3—3 of Fig. 2.

Referring to the drawings, the numeral 5 designates the inner band of metal which has disposed thereabout and concentrically thereof a plurality of metal bands 6, such bands being connected to the inner band by means of the springs 7, each one of which as shown consists of the two bowed leaves 8 and 9 having the portions 10 thereof riveted as at 11 to the respective concentric bands, while the ends of the leaves are fastened together in any suitable manner.

It will also be noted that these springs alternate throughout the circumference of the present tire and that the space between each two springs and each pair of concentric bands is filled by a block 10' of rubber.

Carried by the outer band is the tread carrying band or rim 11' which carries the tread 12, preferably of solid rubber, and is further provided with the flanges or cleats 13 which are adapted to embrace the edges of the outer concentric band and be secured thereto by rivets or otherwise. In this manner, the tread carrying rim is held against circumferential movement.

Carried by the inner band 5 of the present tire are a plurality of rim engaging clamps 14 which are adapted to surround the inner rim 15 of the wheel and thus securely hold the present tire thereupon.

What I claim as new is:

In a tire, the combination of a plurality of concentric spaced bands, pairs of connected springs arranged in circumferentially spaced relation between the bands, and resilient blocks arranged between the connected ends of the springs and the adjacent bands, the intermediate portions of said springs being bowed outwardly from each other and having securement with the adjacent bands.

In testimony whereof I affix my signature.

JOHN ARN.

Copies of this patent may be obtained for five cents each, by addressing the "Commissioner of Patents, Washington, D. C."